(12) United States Patent  
Giltug

(10) Patent No.: US 11,174,140 B1  
(45) Date of Patent: Nov. 16, 2021

(54) HOIST MOUNTING APPARATUS AND SYSTEM

(71) Applicant: Ignatius Giltug, Mesa, AZ (US)

(72) Inventor: Ignatius Giltug, Mesa, AZ (US)

( * ) Notice: Subject to any disclaimer, the term of this patent is extended or adjusted under 35 U.S.C. 154(b) by 0 days.

(21) Appl. No.: 15/930,512

(22) Filed: May 13, 2020

(51) Int. Cl.
| | |
|---|---|
| F16M 13/02 | (2006.01) |
| B66F 7/28 | (2006.01) |
| B66C 5/02 | (2006.01) |

(52) U.S. Cl.
CPC ............... B66F 7/28 (2013.01); B66C 5/02 (2013.01); F16M 13/02 (2013.01)

(58) Field of Classification Search
CPC combination set(s) only.
See application file for complete search history.

(56) References Cited

U.S. PATENT DOCUMENTS

| | | | | |
|---|---|---|---|---|
| 2,177,525 | A * | 10/1939 | Henderson | B66C 1/42 414/542 |
| 2,424,899 | A * | 7/1947 | Priester | B66C 7/00 212/325 |
| 2,562,189 | A * | 7/1951 | Harris | A61G 21/00 414/461 |
| 3,473,677 | A | 10/1969 | Zeiter | |
| 4,004,778 | A | 1/1977 | Steinhagen | |
| 4,690,248 | A | 9/1987 | Killeen | |
| 5,427,356 | A * | 6/1995 | Krotov | B66C 19/02 182/129 |
| 5,720,400 | A * | 2/1998 | Altizer, Sr. | B60P 1/5471 212/180 |
| D408,608 | S * | 4/1999 | Brown | D34/33 |
| 6,454,049 | B1 * | 9/2002 | Dorsett | E06C 7/12 182/102 |
| 7,261,631 | B1 * | 8/2007 | Golson, Sr. | A22B 5/06 452/187 |
| 8,418,814 | B1 * | 4/2013 | Byers | B66B 9/00 187/342 |
| D728,186 | S | 4/2015 | Clark | |
| 9,056,748 | B2 | 6/2015 | Sears | |
| 9,487,380 | B2 | 11/2016 | Hanley | |
| 9,701,520 | B2 * | 7/2017 | Pruskauer | B66C 23/205 |
| 10,260,283 | B2 | 4/2019 | Gregory | |
| 2009/0095944 | A1 | 4/2009 | Gaines | |
| 2013/0315698 | A1 * | 11/2013 | DiSandro | B65G 67/02 414/572 |

\* cited by examiner

Primary Examiner — Monica E Millner

(57) ABSTRACT

A hoist mounting apparatus includes a pair of vertical supports. Each of the vertical supports has an upper end and a lower end. Each of the lower ends comprises a mount configured to releasably engage a roof hatch frame. A horizontal support is positioned on and extends between the vertical supports. The horizontal support is freely movable with respect to the vertical supports. The horizontal support has a first end, a second end, a first side edge and a second side edge. The horizontal support is elongated and has a longitudinal axis extending through the first and second end ends. The horizontal support has an elongated opening therein extending along the longitudinal axis. The electric hoist is positionable on the horizontal support such that a cable attached to the electric hoist extends downwardly through the elongated opening.

7 Claims, 4 Drawing Sheets

HOIST MOUNTING APPARATUS AND SYSTEM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) FIELD OF THE INVENTION

The disclosure relates to hoist mount and more particularly pertains to a new hoist mount for use with a roof hatch to allow for the lifting and lowering of an object through the roof hatch. Such a device will facilitate movement of objects and prevent injuries to persons moving heavy equipment and work materials through the roof hatch.

(2) Description of Related Art Including Information Disclosed Under 37 CFR 1.97 and 1.98

The prior art relates to hoist mounts used for supporting a hoist on worksite or other like location.

(h) BRIEF SUMMARY OF THE INVENTION

An embodiment of the disclosure meets the needs presented above by generally comprising a pair of vertical supports. Each of the vertical supports has an upper end and a lower end. Each of the lower ends comprises a mount configured to releasably engage a roof hatch frame. A horizontal support is positioned on and extends between the vertical supports. The horizontal support is freely movable with respect to the vertical supports. The horizontal support has a first end, a second end, a first side edge and a second side edge. The horizontal support is elongated and has a longitudinal axis extending through the first and second end ends. The horizontal support has an elongated opening therein extending along the longitudinal axis. The electric hoist is positionable on the horizontal support such that a cable attached to the electric hoist extends downwardly through the elongated opening.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
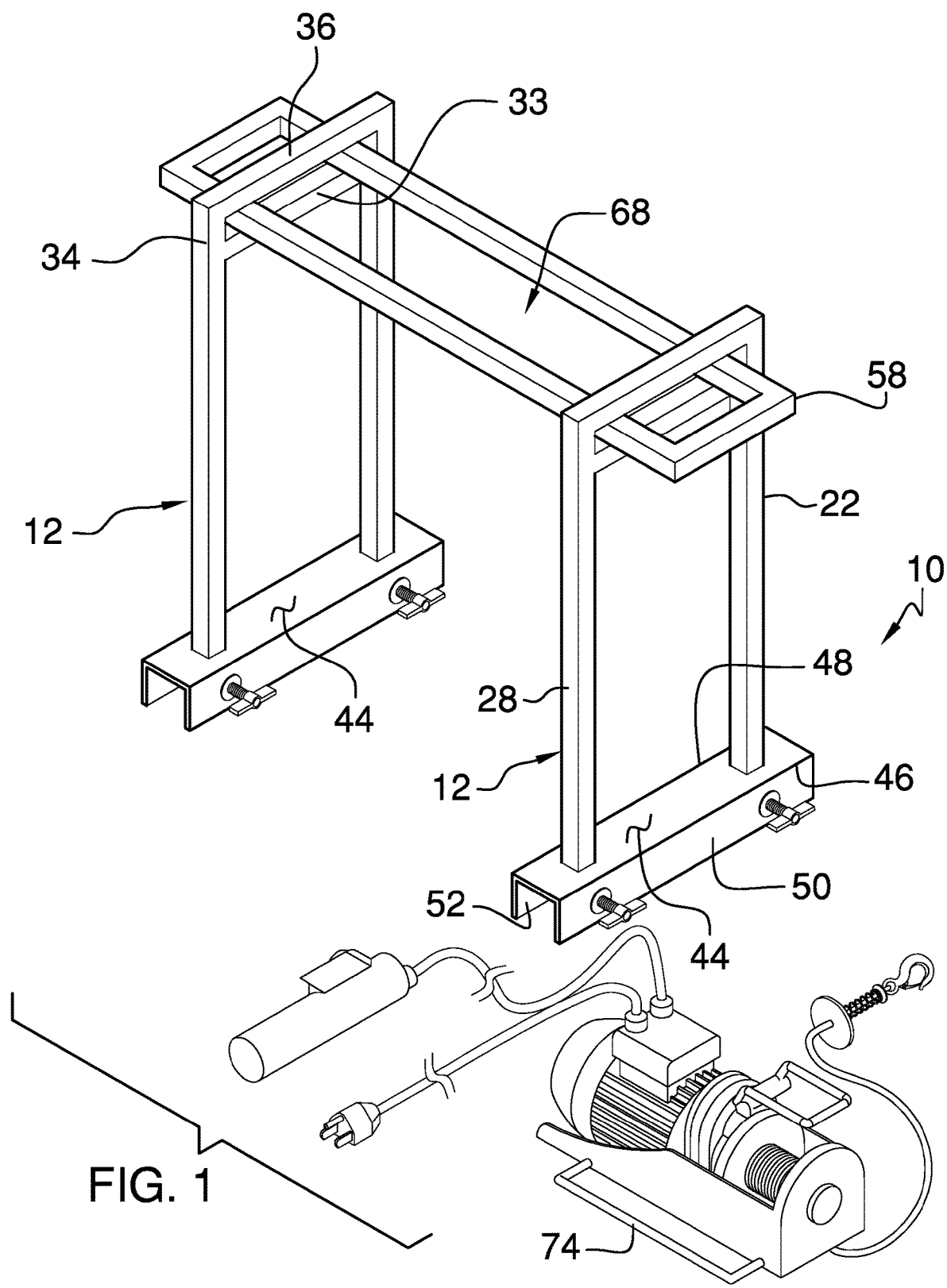
FIG. 1 is a top isometric view of a hoist mounting apparatus and system according to an embodiment of the disclosure.
Figure 2:
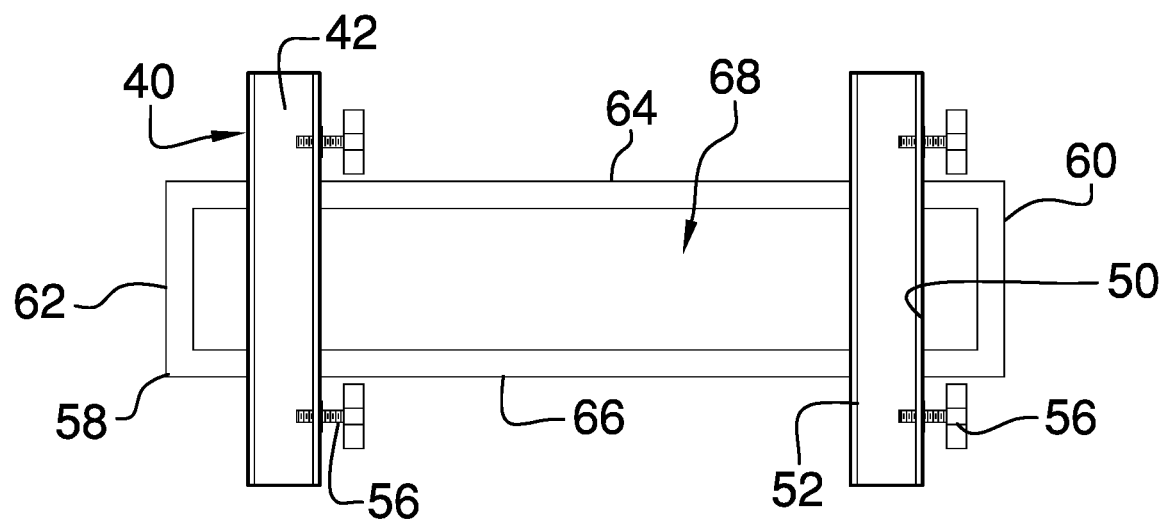
FIG. 2 is a side view of an embodiment of the disclosure.
Figure 3:
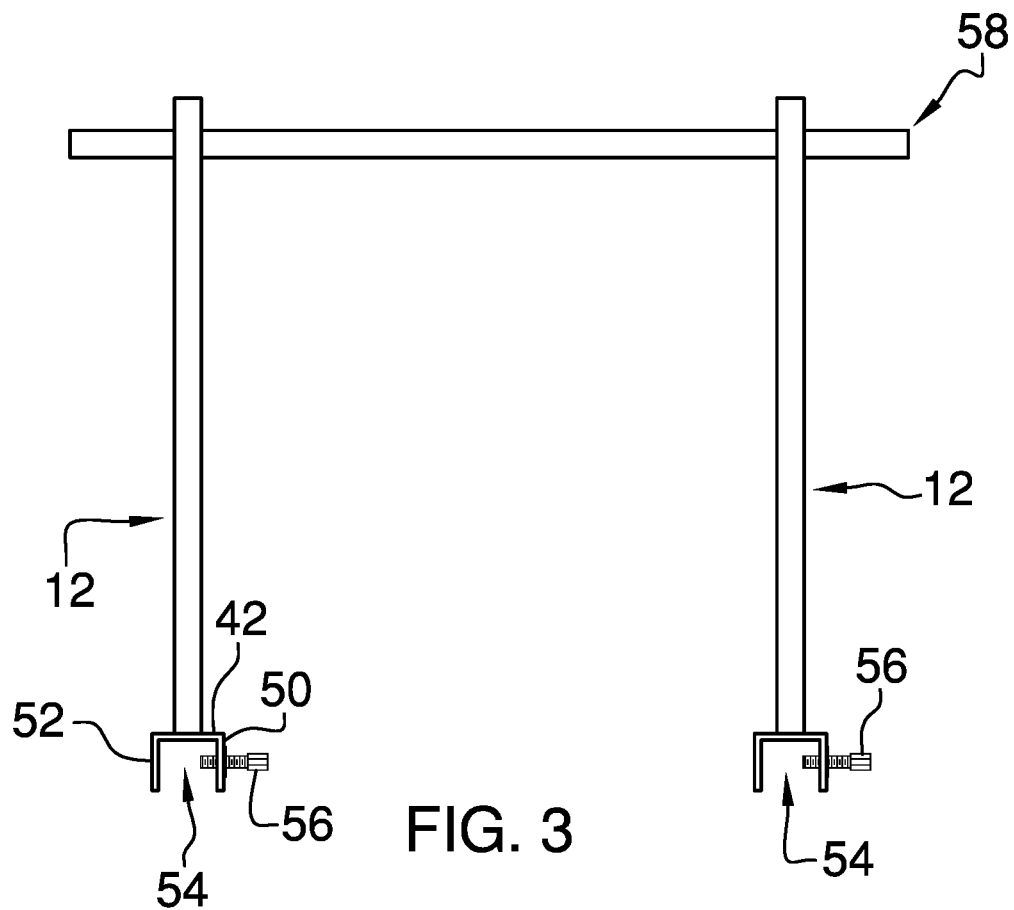
FIG. 3 is a bottom view of an embodiment of the disclosure.
Figure 4:
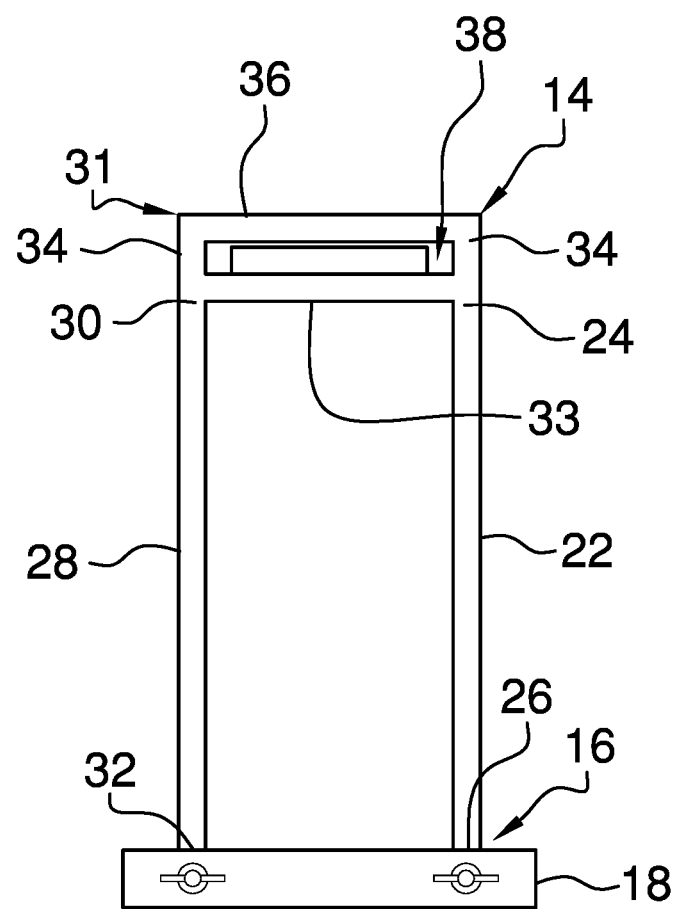
FIG. 4 is a rear view of an embodiment of the disclosure.
Figure 5:
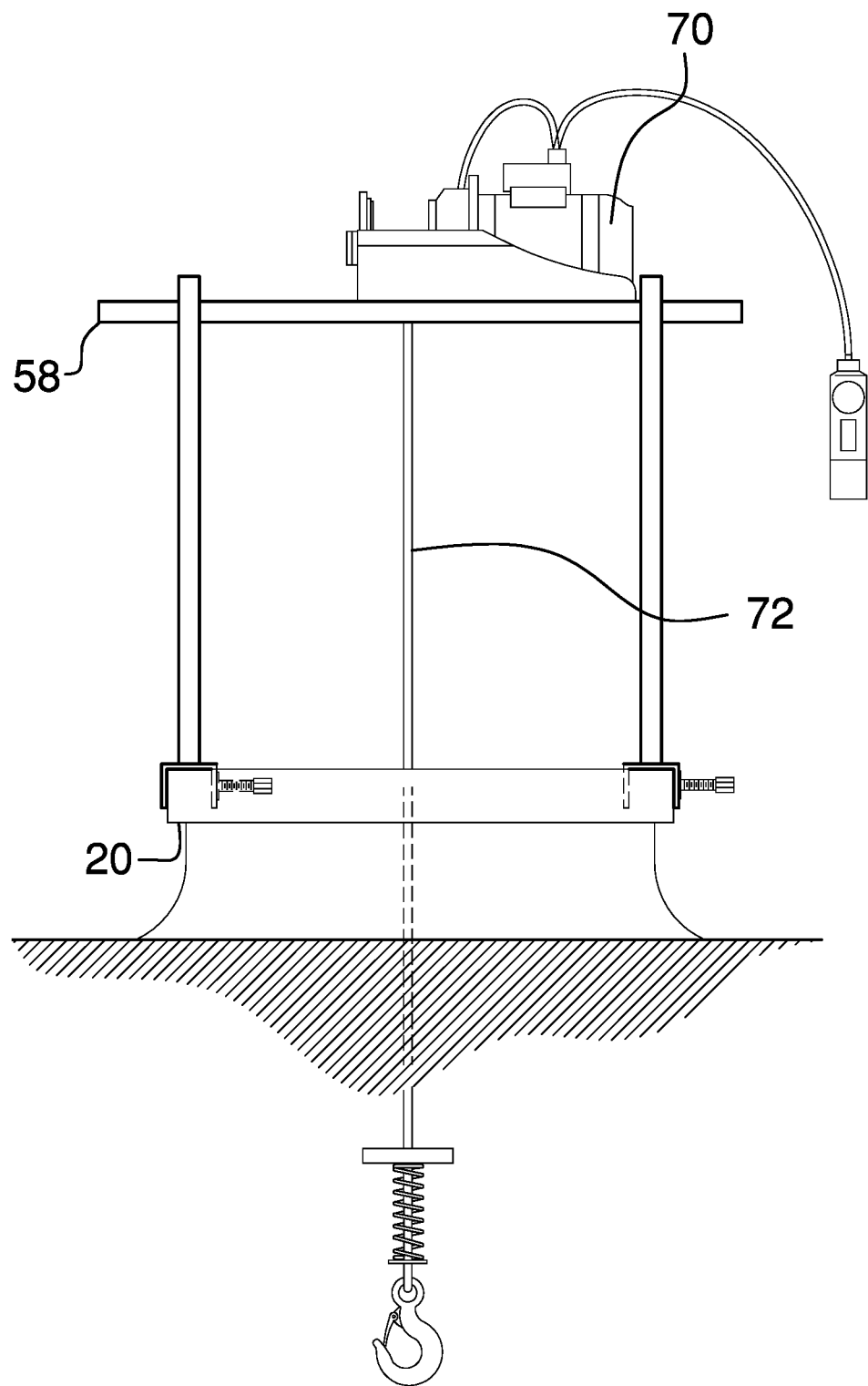
FIG. 5 is a front in-use view of an embodiment of the disclosure.

With reference now to the drawings, and in particular to FIGS. 1 through 5 thereof, a new hoist mount embodying the principles and concepts of an embodiment of the disclosure and generally designated by the reference numeral 10 will be described.

As best illustrated in FIGS. 1 through 5, the hoist mounting apparatus 10 and system generally comprises a pair of vertical supports 12. Each of the vertical supports 12 has an upper end 14 and a lower end 16 wherein each of the lower ends 16 comprises a mount 18 configured to releasably engage a roof hatch frame 20.

The vertical supports 12 each include a first vertical member 22 having a top end 24 and a bottom end 26. A second vertical member 28 has a top end 30 and a bottom end 32. The first 22 and second 28 vertical members each have a same height with respect to each other. Each of the first 22 and second 28 vertical members has a height between 2.0 feet and 5.0 feet.

A receiver 31 forms the upper end 14 and is attached to and extends between the top ends 24, 30 of the first 22 and second vertical 28 members such that the first 22 and second 28 vertical members are positioned between 10.0 inches and 24.0 apart from each other. The receiver 31 includes a horizontal member 33 and a pair of lateral guides 34. An upper guide 36 is attached to and extends between the lateral guides 34. As can be seen in the Figures, the horizontal member 33, upper guide 36 and lateral guides 34 form a rectangular opening 38.

The vertical supports 12 further each include a base 40 that is attached to and extends between the bottom ends 26, 32 of the first 22 and second 28 vertical members. The base 40, which forms the mount 18, is configured to engage the roof hatch frame 20. The base 40 includes a plate 42 that has a top side 44. The first 22 and second 28 vertical members extend upwardly from the top side 44. The plate 42 has a first lateral edge 46 and a second lateral edge 48, wherein a first lateral wall 50 is attached to and extends downwardly from the first lateral edge 46 and a second lateral wall 52 is attached to and extends downwardly from the second lateral edge 48. A space 54 between the first 50 and second 52 lateral walls receives the roof hatch frame 20. A coupler 56 extends through the first lateral wall 50 and is configured to frictionally engage the roof hatch frame 20. The coupler 56 may comprise, for example, a screw that is threadably coupled to the first lateral wall 50 and abuts the roof hatch frame 20.

A horizontal support 58 is positioned on and extends between the vertical supports 12. The horizontal support 58 is freely movable with respect to the vertical supports 12. The horizontal support 58 has a first end 60, a second end 62, a first side edge 64 and a second side edge 66. The horizontal support 58 is elongated and has a longitudinal axis extending through the first 60 and second 62 end ends. The horizontal support 58 has an elongated opening 68 therein extending along the longitudinal axis. An electric hoist 70 is positionable on the horizontal support 58 such that a cable 72 attached to the electric hoist 70 extends downwardly through the elongated opening 68. The horizontal support 58 extends through the rectangular opening 38 in the receiver 31 and a height of the rectangular opening 38 may be within 0.5 inches of a height of the horizontal support 58.

As can be seen in the Figures, the horizontal support 58 may be comprised of a rectangular frame. The term "freely movable" is defined herein as the horizontal support 58 preferably not being encumbered by any securing means attaching the horizontal support 58 to the vertical supports 12. This allows a distance between the vertical supports 12 to be altered as needed as well as facilitating the assembly, disassembly and transport of the apparatus 10.

In use, the vertical supports 12 are each attached to the roof hatch frame 20 such that the vertical supports 12 are positioned on opposite sides of the roof hatch 20. The horizontal support 58 is then slid through the receivers 31 such that the horizontal support 58 traverses an opening through a roof bounded by the roof hatch frame 20. An electric hoist 70 is then positioned on the horizontal support 58 such that the cable 72 therefrom can extend through the elongated opening 68. The hoist 70 may include additional brackets 74 to stabilize the electric hoist 70 on the horizontal support 58.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hoist support assembly for supporting an electric hoist over a roof hatch, the assembly comprising:
    a pair of vertical supports, each of the vertical supports having a top end and a lower end, each of the lower ends comprising a mount configured to releasably engage a roof hatch frame, each of the vertical supports having an upper end;
    a horizontal support being positioned on and extending between the vertical supports, the horizontal support being freely movable with respect to the vertical supports, the horizontal support having a first end, a second end, a first side edge and a second side edge, the horizontal support being elongated and having a longitudinal axis extending through the first and second end ends, the horizontal support having an elongated opening therein extending along the longitudinal axis, wherein the electric hoist is positionable on the horizontal support such that a cable attached to the electric hoist extends downwardly through the elongated opening; and
    wherein each of the vertical supports includes:
        a first vertical member having a top end and a bottom end;
        a second vertical member having a top end and a bottom end, the first and second vertical members having a same height with respect to each other;
        a receiver forming the upper end and being attached to and extending between the top ends of the first and second vertical member, the receiver including a horizontal member and a pair of lateral guides; and
        the horizontal support being positioned on the horizontal member and between associated ones of the lateral guides.

2. The hoist support assembly according to claim 1, wherein each of the first and second vertical members has a height between 2.0 feet and 5.0 feet.

3. The hoist support assembly according to claim 1, wherein the receiver includes an upper guide being attached to and extending between the lateral guides, the horizontal support being positioned between corresponding ones of the upper guide and horizontal member.

4. The hoist support assembly according to claim 1, wherein each of the vertical supports includes a base being attached to and extending between the bottom ends of the first and second vertical members, the base being configured to engage the roof hatch frame.

5. The hoist support assembly according to claim 4, wherein the base includes a plate having a top side, the first and second vertical members extending upwardly from the top side, the plate having a first lateral edge and a second lateral edge, a first lateral wall being attached to and extending downwardly from the first lateral edge, a second lateral wall being attached to and extending downwardly from the second lateral edge, a space between the first and second lateral walls receiving the roof hatch frame.

6. The hoist support assembly according to claim 5, wherein the base includes a coupler extending through the first lateral wall and being configured to frictionally engage the roof hatch frame.

7. A hoist support assembly for supporting an electric hoist over a roof hatch, the assembly comprising:
    a pair of vertical supports, each of the vertical supports having a top end and a lower end, each of the lower ends comprising a mount configured to releasably engage a roof hatch frame, each of the vertical supports having an upper end, each of the vertical supports including:
a first vertical member having a top end and a bottom end;
a second vertical member having a top end and a bottom end, the first and second vertical members having a same height with respect to each other, each of the first and second vertical members having a height between 2.0 feet and 5.0 feet;
a receiver forming the upper end and being attached to and extending between the top ends of the first and second vertical member, the receiver including a horizontal member and a pair of lateral guides, an upper guide being attached to and extending between the lateral guides;
a base being attached to and extending between the bottom ends of the first and second vertical members, the base being configured to engage the roof hatch frame, the base including a plate having a top side, the first and second vertical members extending upwardly from the top side, the plate having a first lateral edge and a second lateral edge, a first lateral wall being attached to and extending downwardly from the first lateral edge, a second lateral wall being attached to and extending downwardly from the second lateral edge, a space between the first and second lateral walls receiving the roof hatch frame;
a coupler extending through the first lateral wall and being configured to frictionally engage the roof hatch frame;
a horizontal support being positioned on and extending between the vertical supports, the horizontal support being freely movable with respect to the vertical supports, the horizontal support having a first end, a second end, a first side edge and a second side edge, the horizontal support being elongated and having a longitudinal axis extending through the first and second end ends, the horizontal support having an elongated opening therein extending along the longitudinal axis, wherein the electric hoist is positionable on the horizontal support such that a cable attached to the electric hoist extends downwardly through the elongated opening.

\* \* \* \* \*